United States Patent
Bergstra et al.

(10) Patent No.: US 8,278,402 B2
(45) Date of Patent: Oct. 2, 2012

(54) REACTOR SYSTEM AND PROCESS FOR THE CATALYTIC POLYMERIZATION OF OLEFINS, AND THE USE OF SUCH REACTOR SYSTEM IN CATALYTIC POLYMERIZATION OF OLEFINS

(75) Inventors: Michiel Bergstra, Helsinki (FI); Erik Eriksson, Helsinki (FI); Gunter Weickert, Ahaus (DE)

(73) Assignee: Borealis Technology Oy, Porvoo (FI)

( * ) Notice: Subject to any disclaimer, the term of this patent is extended or adjusted under 35 U.S.C. 154(b) by 0 days.

(21) Appl. No.: 12/809,906

(22) PCT Filed: Dec. 23, 2008

(86) PCT No.: PCT/EP2008/011087
§ 371 (c)(1),
(2), (4) Date: Jun. 21, 2010

(87) PCT Pub. No.: WO2009/080363
PCT Pub. Date: Jul. 2, 2009

(65) Prior Publication Data
US 2010/0273971 A1 Oct. 28, 2010

(30) Foreign Application Priority Data
Dec. 24, 2007 (EP) .................... 07076127

(51) Int. Cl.
*C08F 2/34* (2006.01)
*B01J 19/24* (2006.01)
*C08F 10/00* (2006.01)

(52) U.S. Cl. ........... 526/65; 526/88; 526/918; 422/134; 422/141; 422/142

(58) Field of Classification Search ................. 526/64, 526/65, 918, 88; 422/132, 141, 142, 134
See application file for complete search history.

(56) References Cited

U.S. PATENT DOCUMENTS

| 2,445,328 A | 7/1948 | Keith |
| 4,419,965 A | 12/1983 | Garcia-Mallol et al. |
| 4,532,311 A | 7/1985 | Fulks et al. |
| 4,543,399 A | 9/1985 | Jenkins, III et al. |
| 4,552,203 A | 11/1985 | Chrysostome et al. |
| 4,578,879 A | 4/1986 | Yokoyama et al. |
| 4,621,952 A | 11/1986 | Aronson |
| 4,803,251 A | 2/1989 | Goode et al. |

(Continued)

FOREIGN PATENT DOCUMENTS
BE 1013447 A6 2/2002
(Continued)

*Primary Examiner* — Fred M Teskin
(74) *Attorney, Agent, or Firm* — The Webb Law Firm (57) ABSTRACT

The invention relates to a reactor system for the catalytic polymerization of olefin monomer and optionally comonomer(s), having one or more inlets for olefin monomer, catalyst, optionally for comonomer, chain growth controllers or chain transfer agents, and/or inert gas, an outlet for gas and an outlet for polymerized particles. The reactor system has at least one fluidized bed unit and at least one moving bed unit, wherein the fluidized bed unit has means for maintaining a fluidized bed in the fluidized bed unit and wherein the moving bed unit is provided with an inlet and an outlet which are directly connected to the fluidized bed unit, wherein the outlet of the moving bed unit is provided with means for pneumatically displacing polymer particles from the moving bed unit into the fluidized bed unit.

18 Claims, 3 Drawing Sheets

U.S. PATENT DOCUMENTS

| | | | |
|---|---|---|---|
| 4,855,370 A | 8/1989 | Chirillo et al. | |
| 4,933,149 A | 6/1990 | Rhee et al. | |
| 5,026,795 A | 6/1991 | Hogan | |
| 7,446,156 B2 * | 11/2008 | Dooley | 526/88 |
| 7,776,973 B2 | 8/2010 | Weickert | |
| 7,781,545 B2 | 8/2010 | Weickert et al. | |
| 2010/0267915 A1 | 10/2010 | Bergstra et al. | |

FOREIGN PATENT DOCUMENTS

| | | |
|---|---|---|
| EP | 0188125 B1 | 5/1990 |
| EP | 0250169 B1 | 9/1991 |
| EP | 0499759 A1 | 8/1992 |
| EP | 0517868 A1 | 12/1992 |
| EP | 0560035 B1 | 10/1997 |
| EP | 0699213 B1 | 2/1998 |
| EP | 0579426 B1 | 3/1998 |
| EP | 0684871 B1 | 5/1998 |
| EP | 0707513 B1 | 9/1998 |
| EP | 0600414 B1 | 5/1999 |
| EP | 0696293 B1 | 5/2000 |
| EP | 0721798 B1 | 3/2002 |
| EP | 1484343 A1 | 12/2004 |
| EP | 1415999 B1 | 12/2007 |
| WO | 94/25495 A1 | 11/1994 |
| WO | 00/26258 A1 | 5/2000 |
| WO | 00/29452 A1 | 5/2000 |
| WO | 0105845 A1 | 1/2001 |
| WO | 2004/111095 A1 | 12/2004 |
| WO | 2005/087361 A1 | 9/2005 |
| WO | 2007/025640 A1 | 3/2007 |

* cited by examiner

REACTOR SYSTEM AND PROCESS FOR THE CATALYTIC POLYMERIZATION OF OLEFINS, AND THE USE OF SUCH REACTOR SYSTEM IN CATALYTIC POLYMERIZATION OF OLEFINS

BACKGROUND OF THE INVENTION

1) Field of the Invention

The present invention relates to a reactor system and to a process for the catalytic polymerization of olefins, and to the use of such reactor system for catalytic polymerization of olefins.

2) Description of Related Art

The catalytic polymerization of olefins uses among others a catalyst of the Ziegler-Natta type. New generations of catalyst for olefin polymerization including single site catalysts have been developed in view of a more regular polymer structure. During the catalytic polymerization the olefin composition is substantially constant around the particle. Reactor gasses exiting the reactor are compressed and recycled. Make-up monomers and optionally hydrogen are added as needed. Entrained particles can be separated by an interposed cyclone and recycled to the polymerization reactor.

Polyolefins produced using a recent generation of Ziegler-Natta catalysts have a relative narrow molecular weight distribution. The breadth of the molecular weight distribution influences the rheology behaviour and the final mechanical properties of the produced polyolefins.

In order to obtain a broader multimodal molecular weight distribution, use is made of different reactor conditions, such as different concentrations for monomer, comonomer and/or hydrogen. Another option is the use of specific and/or combined catalysts.

Traditionally, cascaded reactors are used for applying different reaction conditions during the catalytic polymerization in order to obtain a broad or multimodal molecular weight distribution.

One such type of reactor is a fluidized bed gas phase reactor. In a fluidized bed gas phase reactor olefins are polymerized in the presence of a polymerization catalyst in an upwards moving gas stream. The reactor is typically a vertical cylindrical vessel containing the fluidized bed. The bed comprises growing polymer particles containing active catalyst dispersed therein. The polymer bed is fluidized with the help of the fluidization gas comprising the olefin monomer, eventual comonomer(s), eventual chain growth controllers or chain transfer agents, such as hydrogen, and eventual inert gas. The fluidization gas is introduced into an inlet chamber at the bottom of the reactor. To make sure that the gas flow is uniformly distributed over the cross-sectional surface area of the inlet chamber the inlet pipe may be equipped with a flow dividing element as known in the art, e.g. U.S. Pat. No. 4,933,149 and EP 684871.

Traditionally from the inlet chamber the gas flow is passed upwards through a fluidization grid into the fluidized bed. The purpose of the fluidization grid is to divide the gas flow evenly through the cross-sectional area of the bed. Sometimes the fluidization grid may be arranged to establish a gas stream to sweep along the reactor walls, as disclosed in WO 2005/087361. Other types of fluidization grids are disclosed, among others, in U.S. Pat. No. 4,578,879, EP 600414 and EP 721798. An overview is given in Geldart and Bayens: The Design of Distributors for Gas-fluidized Beds, Powder Technology, Vol. 42, 1985.

The fluidization gas passes through the fluidized bed. The superficial velocity of the fluidization gas must be higher than minimum fluidization velocity of the particles contained in the fluidized bed, as otherwise no fluidization would occur. On the other hand, the velocity of the gas should be lower than the onset velocity of pneumatic transport, as otherwise the whole bed would be entrained with the fluidization gas. The minimum fluidization velocity and the onset velocity of pneumatic transport can be calculated when the particle characteristics are known by using common engineering practise. An overview is given, among others, in Geldart: Gas Fluidization Technology, J. Wiley & Sons, 1986.

When the fluidization gas is contacted with the bed containing the active catalyst the reactive components of the gas, such as monomers and chain transfer agents, react in the presence of the catalyst to produce the polymer product. At the same time the gas is heated by the reaction heat.

The unreacted fluidization gas is removed from the top of the reactor, compressed and cooled in a heat exchanger to remove the heat of reaction. The gas is cooled to a temperature which is lower than that of the bed to prevent the bed from overheating because of the reaction. It is possible to cool the gas to a temperature where a part of it condenses. When the liquid droplets enter the reaction zone they are vaporised. The vaporisation heat then contributes to the removal of the reaction heat. This kind of operation is called condensed mode and variations of it are disclosed, among others, in WO 2007/025640, U.S. Pat. No. 4,543,399, EP 699213 and WO 94/25495. It is also possible to add condensing agents into the recycle gas stream, as disclosed in EP 696293. The condensing agents are non-polymerisable components, such as propane, n-pentane, isopentane, n-butane or isobutane, which are at least partially condensed in the cooler.

Prior to the entry into the reactor fresh reactants are introduced into the fluidization gas stream to compensate for the losses caused by the reaction and product withdrawal. It is generally known to analyse the composition of the fluidization gas and introduce the gas components to keep the composition constant. The actual composition is determined by the desired properties of the product and the catalyst used in the polymerization.

The catalyst may be introduced into the reactor in various ways, either continuously or intermittently. Among others, WO01/05845 and EP 499759 disclose such methods. Where the gas phase reactor is a part of a reactor cascade the catalyst is usually dispersed within the polymer particles from the preceding polymerization stage. The polymer particles may be introduced into the gas phase reactor as disclosed in EP 1415999 and WO 00/26258.

The polymeric product may be withdrawn from the gas phase reactor either continuously or intermittently. Combinations of these methods may also be used. Continuous withdrawal is disclosed, among others, in WO 00/29452. Intermittent withdrawal is disclosed, among others, in U.S. Pat. No. 4,621,952, EP 188125, EP 250169 and EP 579426.

The top part of the gas phase reactor may include a so called disengagement zone. In such a zone the diameter of the reactor is increased to reduce the gas velocity and allow the particles that are carried from the bed with the fluidization gas to settle back to the bed.

The bed level may be observed by different techniques known in the art. For instance, the pressure difference between the bottom of the reactor and a specific height of the bed may be recorded over the whole length of the reactor and the bed level may be calculated based on the pressure difference values. Such a calculation yields a time-averaged level. It is also possible to use ultrasonic sensors or radioactive sensors. With these methods instantaneous levels may be obtained, which of course may then be averaged over time to obtain time-averaged bed level.

Also antistatic agent(s) may be introduced into the gas phase reactor if needed. Suitable antistatic agents and methods to use them are disclosed, among others, in U.S. Pat. No. 5,026,795, U.S. Pat. No. 4,803,251, U.S. Pat. No. 4,532,311, U.S. Pat. No. 4,855,370 and EP 560035. They are usually polar compounds and include, among others, water, ketones and alcohols.

The reactor may also include a mechanical agitator to further facilitate mixing within the fluidized bed. An example of suitable agitator design is given in EP 707513.

Another type of such reactors is a moving bed reactor.

In the moving bed the catalytic polymerization conditions are different compared to those in the fluidized bed. First, the bed density is higher in the moving bed unit. Furthermore, in order to apply different polymerization conditions use is made of a separation fluidum in order to create different catalytic polymerization conditions. For example, a polymerization may be carried out at a lower concentration of a chaingrowth terminating agent such as hydrogen. Applying a separating fluidum to the moving bed unit results in a separation in reaction conditions between the fluidized bed unit and the moving bed unit. Preferably the separation fluidum is added inside the moving bed, preferably to a level of from 0.1 to 0.7 of the total bed level of the moving bed above the base of the moving bed, and forms a cushion on the moving bed through which cushion of separating fluidum the particulate polymeric material settles on the forming moving bed. The separation fluidum may be a gas or a liquid or a mixture of a gas and a liquid. The separation fluidum may be inert to the catalytic polymerization such as nitrogen and $C_1$-$C_{12}$-alkane.

The separation fluidum may be reactive such as monomer, comonomer such as $C_2$-$C_{12}$-alkylene or mixtures thereof. Mixtures of inert and catalytic polymerization reactive separation fluidum may be used as desired.

Preferably, use is made of a separation fluidum which is a liquid which evaporates under the conditions residing during the catalytic polymerization in the moving bed. Accordingly, during evaporation a gas cushion of separating fluidum is formed and at the same time a cooling of the exothermic polymerization reaction occurs with at the same time a much higher reactant concentration when using reactive separation fluidum.

The addition of separation fluidum but also the reactant to both fluidized bed unit and moving bed unit may be such that in the fluidized bed unit and/or in the moving bed unit a condensed mode polymerization occurs which is beneficial to productivity.

It is further preferred when the separation fluidum comprises a polymerization monomer or comonomer or mixture thereof.

WO2004/111095 discloses a reactor system and a process for the catalytic polymerization of olefins. The reactor system comprises a fluidized bed unit and a moving bed unit which are integrated such that the residence time in the fluidized bed unit and the residence time in the moving bed unit could be independently controlled. The outlet of the moving bed unit connected to the fluidized bed unit could be provided with means for controlling the outflow rate of polymer particles from the moving bed unit into the fluidized bed unit.

The means for controlling the outflow of polymer particles are not further described in WO2004/111095.

SUMMARY OF THE INVENTION

The present invention has for its object to provide means having a good control of the outflow rate of polymer particles from the moving bed unit into the fluidized bed unit while the inflow of fluidization gas from the fluidized bed unit into the moving bed unit via the outlet of the moving bed unit is substantially avoided. This is the true because the low gas velocity and the high reaction rate will increase the risk of a reactor interruption or plugging. Still there will be substantially no interference with the optimal functioning of the moving bed unit and of the fluidized bed unit.

Accordingly, the present invention provides a reactor system for the catalytic polymerization of olefin monomer and optionally comonomer(s), comprising one or more inlets for olefin monomer, catalyst, optionally for comonomer, chain growth controllers or chain transfer agents, and/or inert gas, an outlet for gas and an outlet for polymerized particles, which reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are directly connected to the fluidized bed unit, wherein the outlet of the moving bed unit is provided with means for pneumatically displacing polymerized particles from the moving bed unit into the fluidized bed unit.

The pneumatic displacement means exert a suction pressure at the outlet of the moving bed unit thereby facilitating or improving the outflow of polymer particles. The pneumatic means due to the pneumatic gas stream will resist the substantially counter current fluidization gas stream thereby decreasing or inhibiting the inflow of fluidization gas via the outlet into the moving bed unit. Accordingly, the residence time of the polymer particles in the moving bed unit is controlled.

An optimal pneumatic effect of the displacement means on the polymer particles in or near the outlet of the moving bed unit is obtained, if preferably the pneumatic displacement means comprise means for sidewise directing gas at the outlet of the moving bed unit. The sidewise directed gas provides for an optimal suction pressure on the polymer particles in the outlet of the moving bed.

In general it is possible to use for the pneumatic displacement means an external gas source. However, it is preferred to use fluidization gas. For reasons that by using fluidization gas the conditions residing in the fluidized bed unit will substantially not be effected, and the total amount of fluidization gas fed into the fluidized bed unit will be constant. Accordingly, it is preferred that the pneumatic displacing means comprise an inlet for fluidization gas. According to another preferred embodiment all fluidization gas may enter the fluidized bed unit via the pneumatic displacement means and to that extend the means for maintaining the fluidized bed comprise an inlet for fluidization gas, which inlet is connected to the pneumatic displacing means.

The gas flow used by the pneumatic displacement means for subtracting polymer particles from the moving bed may subsequently be used for maintaining and/or sustaining the fluidized bed conditions in the fluidized bed unit.

Accordingly, it is preferred that the pneumatic displacing means comprise an outlet oriented such in the fluidized bed unit as to generate swirling gas flow in the fluidized bed unit.

Following another embodiment the pneumatic displacement means comprise a recirculation line residing outside the reactor system. Accordingly, this recirculation line is available for unit operations and allows for the avoidance of a distribution plate within the fluidized bed unit for establishing and maintaining the fluidized bed conditions. This will result in a less complex and therefore less expensive reactor system. Particularly, under such circumstances it is preferred that the pneumatic displacement means comprise means for sidewise directing gas at the outlet of the moving bed unit. Accordingly, the gas flow for the pneumatic displacement means for each moving bed unit will be reduced which may concomitantly result in a more reduced flow of polymer particles through the moving bed unit which may be of the same or adjusted volume.

According to another aspect of the pneumatic displacement means the flow of polymer particles from the moving bed unit could be deflected in a lateral direction which lateral outflow may be supported and sustained using the pneumatic displacement means. Accordingly, plugging of the outlet of the moving bed unit is substantially avoided and the outflow of polymer particles may be better controlled. Accordingly, it is preferred that the pneumatic displacement means comprise lateral deflecting means connected to the outlet of the moving bed unit, which deflecting means comprise the means for sidewise directing gas at the outlet of the moving bed unit. For the sidewise directed gas flow gas from several sources may be used. However, it is preferred to use fluidization gas which is at least partly originating from the fluidized gas circulation. Accordingly, it is possible to independently of the fluidization conditions within the fluidized bed unit, to control the flow rate of polymer particles out of the moving bed unit. Accordingly, a reactor system is obtained with maximum flexibility.

It is preferred that the pneumatic displacement means comprise means for upwards directing fluidization gas along the lateral deflecting means. Accordingly, it is essentially possible to avoid the use of a distribution plate for distributing the fluidized gas in the fluidized bed unit. Accordingly, the risk for fouling is further reduced.

It is possible that the moving bed unit recites within, around or adjacent the fluidized bed unit. The location of the moving bed unit is therefore flexible and may be determined in relation to the actual reactor design to be used for a particular catalytic polymerization of olefins.

Another aspect of the present invention relates to a process for the catalytic polymerization of olefins, wherein olefins are polymerized with a particulate catalyst, and optionally comonomer, chain growth controllers or chain transfer agents, and/or inert gas, wherein at least part of the polymerization reaction is carried out in a reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are directly connected to the fluidized bed unit, wherein the outlet of the moving bed unit is provided with means for pneumatically displacing polymerized particles from the moving bed unit into the fluidized bed unit.

It is noted that the same objectives and advantages as described above in relation to reactor system according to the invention will also apply to the process according to the invention for the catalytic polymerization of olefins.

As described above, due to the use of the pneumatic displacement means, the inflow of fluidization gas into the moving bed unit via its outlet is substantially blocked. Accordingly, if required the inflow of fluidization gas into the moving bed unit via its inlet communicating with the fluidized bed unit may be hindered and even blocked when preferably separation fluidum is supplied to the moving bed, preferably via the displacement means, and preferably the separation fluidum is a gas or a liquid and selected from the group comprising an inert gas or liquid, such as nitrogen, $C_1$-$C_{12}$-alkane or olefins such as $C_2$-$C_{12}$-alkylene, or mixtures thereof, and preferably the separation fluidum is a liquid evaporating under the residing polymerization conditions.

Still, it is possible that polymer particles enter the moving bed unit via the separation fluidum present in the upper region of the moving bed unit.

If desired the polymerization in the moving bed unit and in the fluidized bed unit may be selected dependent on the desired properties of the ultimate polymer. Accordingly, it is preferable when needed that liquid olefins are added as separation fluidum such that the polymerization in the moving bed unit is a condensed mode polymerization, and/or liquid olefins are added to the fluidized bed such that the polymerization in the fluidized bed unit is in a condensed mode polymerization. If desired the separation fluidum comprises a polymerization monomer or comonomer, or mixture thereof.

Finally, the present invention also relates to the use of the above described reactor system according to the invention for the catalytic polymerization of olefins.

BRIEF DESCRIPTION OF THE DRAWINGS

Mentioned and other features or characteristics of the reactor system or process or use according to the invention will be further illustrated by making reference to preferred embodiments which are given for illustrated purposes without any limitation to the described invention. In this respect reference will be made to the drawings wherein.

DETAILED DESCRIPTION OF THE INVENTION

Figure 1A:
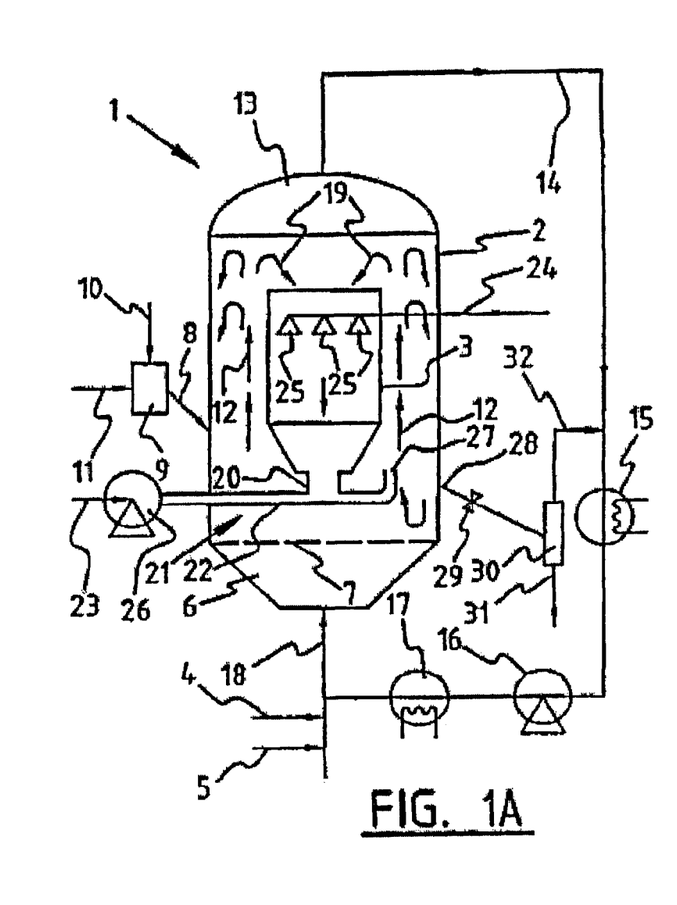
FIG. 1A shows schematically a reactor system according to the invention.

FIG. 1A shows a reactor system 1 according to the invention for the catalytic polymerization of olefins. Olefins used in the process according to the invention comprise $C_2$-$C_{12}$ olefins, preferably $C_2$-$C_8$-olefins such as ethylene, propylene, butene-1, pentene-1, hexene-1,4-methylpentene-1 and octene-1. These olefins may also be used for the production of homopolymers. Copolymers may be produced by using for instance ethylene and/or propylene in combination with other $C_2$-$C_8$ alpha-olefins. Polyenes may be used for copolymerization, such as dienes, for instance 1,3-butadiene, 1,5-hexadiene, dicyclopentadiene, ethylidene norbornene and vinyl norbornene.

In the catalytic polymerization Ziegler-Natta-catalysts are used which are conventional catalysts available in the art. The catalyst could be selected as desired in view of the properties of the polymer.

This reactor system 1 may be a part of a multi-stage process for producing polyolefins, in particular multimodal polyolefins and polyolefins with a broad molecular weight distribution. In this multi-stage process the first reactor is generally a liquid phase reactor as is for example described in EP-A-0 517 868. This first reactor is generally a loop reactor wherein olefins are polymerized in an inert hydrocarbon medium. Preferably, this inert hydrocarbon medium is a low boiling hydrocarbon which could be selected from the group comprising propane, butane, isobutane, pentane, hexane, heptane, octane, cyclohexane and cycloheptane or other inert media. Obviously mixtures of those hydrocarbons could be used as well.

In the first reactor the polymerization is preferably carried out at a temperature of about 60° C. to 110° C. at a pressure of 40-90 bar.

This first polymerization can be carried out under supercritical conditions, wherein the polymerization temperature and pressure are above the corresponding critical points of the mixture formed by the olefins, hydrogen, and fluidum of the inert low boiling hydrocarbon. The temperature and pressure in this first reactor are preferably about 85° C. 110° C. and 50-90 bar, respectively. By using supercritical conditions it is possible to use higher hydrogen and ethylene concentrations as would be possible under sub-critical conditions.

The reaction mixture is removed from the first reactor either continuously or intermittently. Preferably, hydrogen, non-consumed reactants and inert low boiling hydrocarbons are removed preferably by flashing. The remaining gas stream comprising polymer is fed into the reactor system 1 as shown in FIG. 1. The reactor system 1 comprises a fluidized bed unit 2 and a moving bed unit 3.

Monomer is entering the fluidized bed unit via line 4 and optionally via line 5 inert gas, comonomer and/or hydrogen are added. Via a lower space 6 and a gas distribution plate 7, the reaction gas enters the fluidized bed unit 2.

Polymer originating from the previous polymerization is added via line 10 to a unit 9 from where it is transported via line 8 into the fluidized bed unit 2. Other catalyst components may be added to the unit 9 via a line 11.

The moving bed unit 3 resides coaxially in the cylindrical fluidized bed unit 2. Sidewise around the moving bed unit 3 is generated and maintained a fluidized bed of catalytic particles on which particle due to the polymerization reaction further polymer is formed. The composition of the polymer formed is dependent on the residing conditions, such as the concentration of monomer, comonomer, inert gas and hydrogen. The fluidized bed circulation is visualised by the arrows 12. At the top of the fluidized bed reactor polymer particles are separated from gas in a disengaging section 13. The gas leaves the fluidized bed unit via a recirculation line 14. Gas present in line 14 may be optionally cooled in a heat exchanger 15. Subsequently the gas is compressed in a compressor 16 and optionally after further cooling in a heat exchanger 17 reintroduced to the fluidized bed unit via the inlet 18.

A part of the polymer particles in the fluidized bed unit (visualised by arrows 19) enters the moving bed unit 3 and forms a bed of settled polymer particles which move slowly downwardly in a more or less plug stream towards an outlet 20.

On top of the downwards moving bed of polymer particles a cushion of separation of fluidum is formed which is added via the lines 24 and nozzles 25 into the moving bed, preferably at about 0.1 to 0.7 of the height of the bed above the base of the moving bed unit.

The outlet 20 of the moving bed unit 3 is provided with means 21 for pneumatically displacing polymerized particles from the moving bed unit 3 into the fluidized bed unit 2. The pneumatic displacement means comprise a conduit 22 which is sidewise connected to the outlet 20. Gas is fed via a line 23 and a compressor 26 through the conduit 22 along the outlet 20. This flow of gas will result in a suction pressure thereby facilitating or improving the outflow of polymer particles from the moving bed unit 3 into the conduit 22. From there the suspended polymer particles are injected into the fluidized bed reactor via an upwardly directed conduit segment 27 emitting the polymer particle suspension into the substantial same direction as the fluidized gas in the fluidized bed unit as visualized by the arrows 12. Accordingly, the flow behaviour within the fluidized bed unit 2 is substantially not influenced by the pneumatic displacement means used for removing polymer particles from the moving bed unit 3 and transferring them into the fluidized bed unit 2.

The gas flow in the conduit 22 may be controlled via the compressor 26 and accordingly the outflow of polymer particles could be controlled and thereby the residence time of the polymer particles within the moving bed unit 3.

Constantly or intermittently polymer is removed via an outlet 28 provided with a valve 29. In a separator 30 polymer particles are separated and removed via an outlet 31. Gaseous material is recycled via a line 32 into the circulation line 14.

Figure 1B:
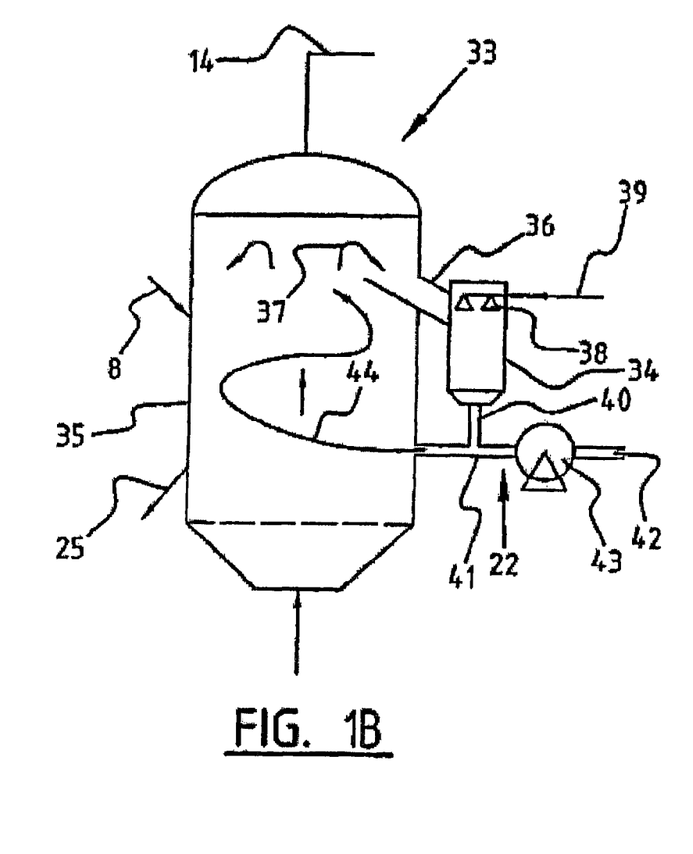
FIG. 1B shows another embodiment of the reactor system according to the invention.

FIG. 1B shows another embodiment of a reactor system 33 according to the invention. In this embodiment the moving bed unit 34 is arranged outside and adjacent a fluidized bed unit 35. The moving bed unit 34 communicates via an inlet 36 with the fluidized bed unit 35 and polymer particle flow according to the arrow 37 through the inlet 36 into the moving bed unit 34. The moving bed 34 is provided with nozzles 38 for providing on top of the moving bed in the moving bed unit 34 a protective cushion of separation fluidum fed via a line 39.

The outlet 40 of the moving bed unit 34 is connected to pneumatic displacement means 22 according to the invention. These displacement means comprise a conduit 41 sidewise connected to the outlet 40 of the moving bed unit 34. A conduit 42 connected to a source of fluidization gas is connected via a compressor 43 to the line 41. The conduit 41 is tangentially connected to the fluidized bed unit 35 thereby erecting a swirl type of fluidized gas circulation as is illustrated by the arrow 44. By controlling the gas output of the pump 43 the amount of polymer particles under suction pressure pneumatically removed from the moving bed unit can be controlled and therewith the residence time of the polymer particles within the moving bed unit 34.

Figure 2:
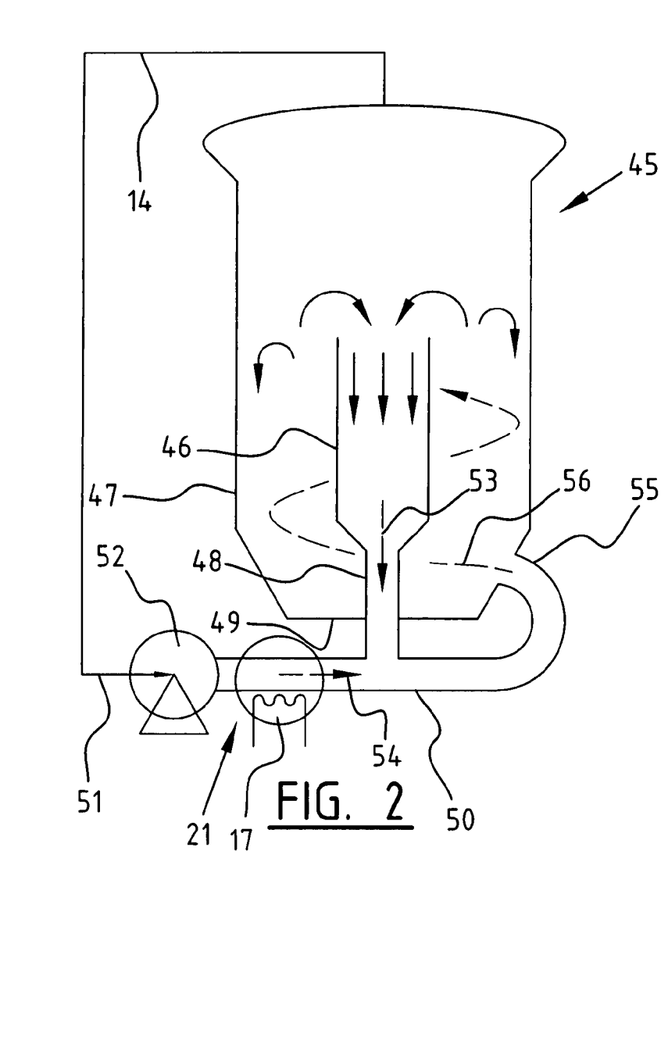
FIGS. 2-6 show still further schematic embodiments of the reactor system according to the invention.

FIG. 2 shows schematically another embodiment of a reactor system 45 according to the invention. A moving bed unit 46 is coaxially arranged within a fluidized bed unit 47. An outlet 48 of the moving bed unit 46 passes through a bottom 49 of the fluidized bed unit 37 to the exterior of the reactor system 45 and there opens into a conduit 50 of pneumatic displacement means 21 according to the invention. In this case all fluidization gas is fed via a line 51 and a pump 52 into the conduit 50 sidewise connected to the outlet 48. Polymer particles according to arrow 52 are suspended in the fluidization gas stream 54 and fed into the fluidized bed unit 47 via an inlet 55. This inlet 55 is oriented such that in the fluidized bed unit is generated a swirling gas flow visualized by the dashed arrow 56. All fluidization gas is fed to the pneumatic displacement means 21. Accordingly, this fluidized bed unit 47 does not comprise a distribution plate for homogeneously distributing the fluidized gas in the fluidized bed unit 47. Still a fluidized gas flow is formed and maintained due to the swirling connection of the inlet 55 into the moving bed unit 47. If the amount of circulation gas is too large, then it is preferred to implement in the fluidized bed unit 47 two or more parallel moving bed units each in contact via their outlet with only a part of the total amount of fluidization gas.

Figure 3:
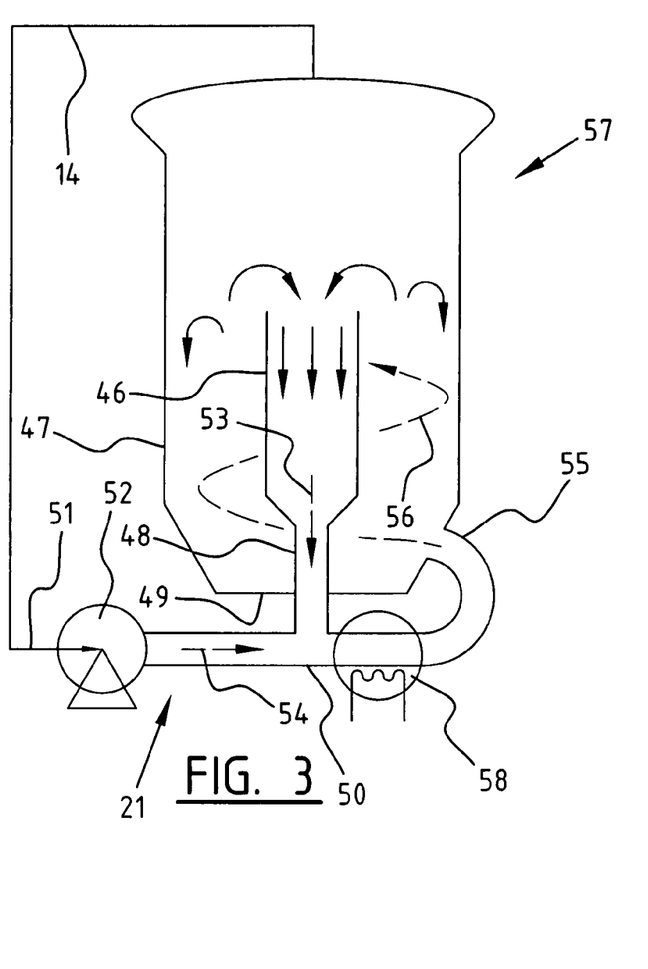

FIG. 3 shows another reactor system 57 according to the invention. The same construction items are referred to by the same reference numbers. The difference is that the external conduit 50 is provided with heat exchange means 58 for cooling the fluidized gas stream in which the polymer particles to be recirculated are suspended.

Figure 4:
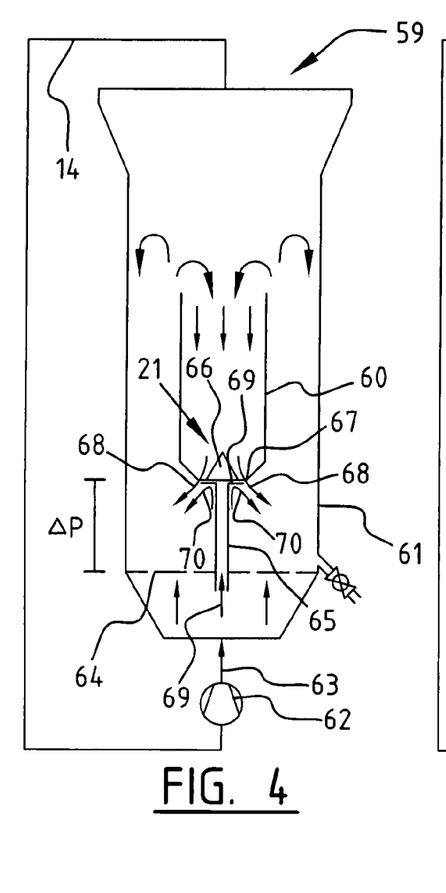

FIG. 4 shows another reactor system 59 according to the invention. A moving bed unit 60 is coaxially arranged within a fluidized bed unit 61. Fluidized gas is fed via a compressor 62 and a line 63 into the fluidized bed unit and passes through a distribution plate 64. Part of the fluidized gas flows into a conduit 65 which is connected to the pneumatic displacement means 21. The pneumatic displacement means comprise a cone 66 which resides in an outlet 67 of the moving bed unit 60. Polymer particles are sidewise deflected over the cone 66 according to the arrow 68. This flow of polymer particles is sustained or improved via the fluidization gas which following the arrows 69 and 70 is sidewise streaming along the outlet 67 thereby by suction pressure improves and/or sustains the outflow of polymer particles according to the arrow 68. The cone 66 is thereto provided with a number of lateral conduits 69. Obviously, the pressure difference over the distribution plate up to the conduits 69 is important and determines the outflow of polymer particles.

Figure 5:
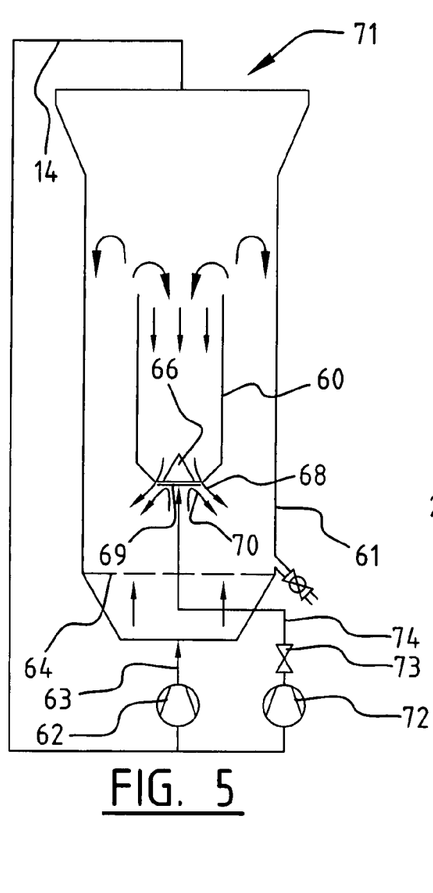

FIG. 5 discloses a reactor system 71 which is similar to the reactor system 59 illustrated in FIG. 4.

In the reactor system 71 the gas flow, preferably fluidization gas is fed via a compressor 72 and a regulating valve 73 and a line 74 directly towards to the lateral conduits 69 formed in the cone 66. Accordingly, this provides more flexibility in the regulation and control of the outflow of polymer particles according to the arrow 68 out of the moving bed unit 60 due to the regulation of the gas flow and gas pressure using the compressor 72 and the valve 73.

Figure 6:
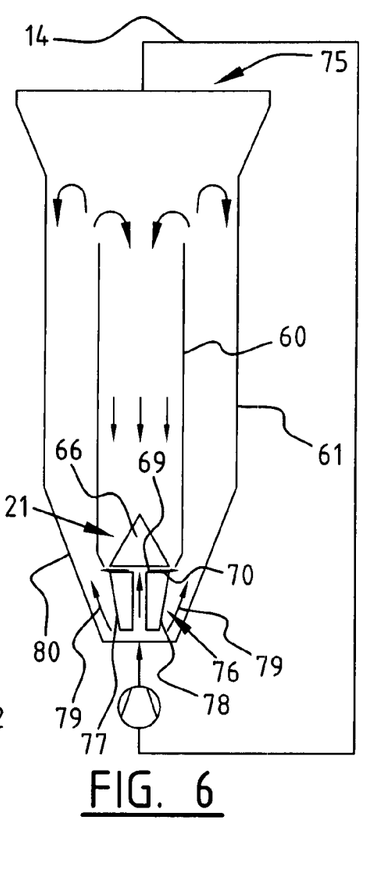

Finally, FIG. 6 shows another reactor system 75 according to the invention which has a similar design as the reactor systems 59 and 71 illustrated in the FIGS. 4 and 5, respectively. In this case the pneumatic displacement means 21 comprise means 76 for upwardly directing fluidization gas along the lateral deflecting means. To this extend the means 76 comprise mutually diverting surfaces 77 and 78 directing the fluidization gas following the arrows 79 over the conical circumference of the surfaces 77 and 78 uniformly along the lateral conduits 69 in the cone 66. Furthermore, the fluidized bed is provided with a diverting lower section 80 smoothly directing the fluidization gas following the arrows 79 along the conduits 69 thereby entraining polymer particles towards the upper region of the fluidized bed unit. Accordingly, this reactor system 75 is properly operating without the use of a distribution plate for uniformly distributing the fluidized gas. Accordingly, it is reactor system 65 is less complex and therefore less expensive and there is a reduced risk for fouling of the distribution plate when present and fine particles enter into the space below such distribution plate.

The invention claimed is:

1. A reactor system for the catalytic polymerization of olefin monomer and optionally comonomer(s), comprising:
   one or more inlets for olefin monomer, catalyst, optionally for comonomer, chain growth controllers or chain transfer agents, and/or inert gas,
   an outlet for gas and
   an outlet for polymerized particles,
wherein the reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are directly connected to the fluidized bed unit, wherein the outlet of the moving bed unit is provided with means for pneumatically displacing polymer particles from the moving bed unit into the fluidized bed unit, wherein the moving bed unit is provided with one or more inlets for separation fluidum inside the moving bed unit at a level of from 0.1 to 0.7 of the total bed level of the moving bed above a base of the moving bed.

2. The reactor system according to claim 1, wherein the pneumatic displacement means comprise means for sidewise directing gas at the outlet of the moving bed unit.

3. The reactor system according to claim 1, wherein the pneumatic displacing means comprise an inlet for fluidization gas.

4. A reactor system for the catalytic polymerization of olefin monomer and optionally monomer(s), comprising: one or more inlets for olefin monomer, catalyst, optionally for comonomer, chain growth controllers or chain transfer agents, and/or inert gas, an outlet for gas and an outlet for polymerized particles, wherein the reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are directly connected to the fluidized bed unit wherein the outlet of the moving bed unit is provided with means for pneumatically displacing polymer particles from the moving bed unit into the fluidized bed unit, wherein the moving bed unit is provided with one or more inlets for separation fluidum inside the moving bed unit at a level of from 0.1 to 0.7 of the total bed level of the moving bed above a base of the moving bed, wherein the means for maintaining the fluidized bed comprise an inlet for fluidization gas, which inlet is connected to the pneumatic displacing means.

5. The reactor system according to claim 1, wherein the pneumatic displacing means comprise an outlet oriented in the fluidized bed unit so as to generate swirling gas flow in the fluidized bed unit.

6. A reactor system for the catalytic polymerization of olefin monomer and optionally comonomer(s), comprising:
   one or more inlets for olefin monomer, catalyst, optionally for comonomer, chain growth controllers or chain transfer agents, and/or inert gas,
   an outlet for gas and
   an outlet for polymerized particles,
wherein the reactor system comprises at least one fluidized bed unit and at least two moving bed units, wherein the fluidized bed unit comprises means for maintaining a fluidized bed in the fluidized bed unit and wherein each moving bed unit is provided with an inlet for fluidization gas and an outlet which are directly connected to the fluidized bed unit, wherein the outlet of the moving bed unit is provided with means for pneumatically displacing polymer particles from the moving bed unit into the fluidized bed unit, wherein the moving bed unit is provided with one or more inlets for separation fluidum inside the moving bed unit at a level of from 0.1 to 0.7 of the total bed level of the moving bed above a base of the moving bed.

7. A reactor system for the catalytic polymerization of olefin monomer and optionally comonomer(s), comprising:
   one or more inlets for olefin monomer, catalyst, optionally for comonomer, chain growth controllers or chain transfer agents, and/or inert gas,
   an outlet for gas and
   an outlet for polymerized particles,
wherein the reactor system comprises at least one fluidized bed unit and at least one moving bed unit, wherein the fluidized bed unit comprises means for maintaining a fluidized bed in the fluidized bed unit and wherein the moving bed unit is provided with an inlet and an outlet which are directly connected to the fluidized bed unit, wherein the outlet of the moving bed unit is provided with means for pneumatically displacing polymer particles from the moving bed unit into the fluidized bed unit, wherein the moving bed unit is provided with one or more inlets for separation fluidum inside the moving bed unit at a level of from 0.1 to 0.7 of the total bed level of the moving bed above a base of the moving bed, wherein the pneumatic displacement means comprise lateral deflecting means connected to the outlet of the moving bed unit, the deflecting means comprise means for sidewise directing gas at the outlet of the moving bed unit.

8. The reactor system according to claim 7, wherein the means for sidewise directing gas at the outlet of the moving bed unit comprise an inlet for fluidization gas.

9. The reactor system according to claim 7, wherein the pneumatic displacement means comprise means for upwardly directing fluidization gas along the lateral deflecting means.

10. The reactor system according to claim 1, wherein the moving bed unit resides within, around, or adjacent to the fluidized bed unit.

11. A process for the catalytic polymerization of olefins, comprising the step of polymerizing olefins with a particulate catalyst, and optionally comonomer, chain growth controllers or chain transfer agents, and/or inert gas, wherein at least part of the polymerization reaction is carried out in a reactor system comprising at least one fluidized bed unit and at least one moving bed unit, wherein the fluidized bed unit comprises means for maintaining a fluidized bed in the fluidized bed unit and wherein the moving bed unit is provided with an inlet and an outlet which are directly connected to the fluidized bed unit, wherein the outlet of the moving bed unit is provided with means for pneumatically displacing polymerized particles from the moving bed unit into the fluidized bed unit, and wherein separation fluidum is added inside the moving bed unit at a level of from 0.1 to 0.7 of the total bed level of the moving bed above a base of the moving bed.

12. The process according to claim 11, wherein the pneumatic displacing means comprise an outlet oriented in the fluidized bed unit so as to generate swirling flow in the fluidized bed.

13. The process according to claim 11, wherein separation fluidum is supplied to the moving bed, and wherein the separation fluidum is a liquid evaporating under the residing polymerization conditions.

14. The process according to claim 11, wherein liquid olefins are added as separation fluidum such that the polymerization in the moving bed unit is a condensed mode polymerization.

15. The process according to claim 11, wherein liquid olefins are added to the fluidized bed such that the polymerization in the fluidized bed is in a condensed mode polymerization.

16. The process according to claim 13, wherein the separation fluidum comprises a polymerization monomer or comonomer, or mixture thereof.

17. The process according to claim 11, wherein the separation fluidum is an inert gas or liquid.

18. The process according to claim 17, wherein the separation fluidum is nitrogen, $C_1$-$C_{12}$-alkane, $C_2$-$C_{12}$-alkene, or mixtures thereof.

* * * * *

UNITED STATES PATENT AND TRADEMARK OFFICE
CERTIFICATE OF CORRECTION

PATENT NO. : 8,278,402 B2
APPLICATION NO. : 12/809906
DATED : October 2, 2012
INVENTOR(S) : Michiel Friso Bergstra et al.

Page 1 of 1

It is certified that error appears in the above-identified patent and that said Letters Patent is hereby corrected as shown below:

Column 10, Line 2, Claim 4, delete "monomer(s)" and insert -- comonomer(s) --

Column 10, Line 11, Claim 4, after "unit" insert -- , --

Signed and Sealed this
First Day of January, 2013

David J. Kappos
*Director of the United States Patent and Trademark Office*